United States Patent
Belenky et al.

(10) Patent No.: US 8,457,309 B2
(45) Date of Patent: Jun. 4, 2013

(54) PRIVATE KEY COMPRESSION

(75) Inventors: Yaacov Belenky, Maaleh Adumim (IL); Yaakov (Jordan) Levy, Maaleh Adumim (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/322,211

(22) PCT Filed: Jun. 28, 2010

(86) PCT No.: PCT/IB2010/052935
§ 371 (c)(1),
(2), (4) Date: Dec. 15, 2011

(87) PCT Pub. No.: WO2011/077269
PCT Pub. Date: Jun. 30, 2011

(65) Prior Publication Data
US 2012/0263296 A1    Oct. 18, 2012

(30) Foreign Application Priority Data
Dec. 24, 2009    (IL) .......................................... 202973

(51) Int. Cl.
*H04L 29/06*    (2006.01)

(52) U.S. Cl.
USPC ............... 380/44; 380/30; 380/264; 380/265; 708/603

(58) Field of Classification Search
USPC ....................... 380/30, 44, 264, 265; 708/603
See application file for complete search history.

(56) References Cited

U.S. PATENT DOCUMENTS

| 4,405,829 A | 9/1983 | Rivest et al. |
| 5,201,000 A * | 4/1993 | Matyas et al. .................. 380/30 |
| 6,895,504 B1 | 5/2005 | Zhang et al. |
| 7,340,606 B2 | 3/2008 | Belenky et al. |
| 2008/0253573 A1 | 10/2008 | Sakurai |

OTHER PUBLICATIONS

Nathalie Feyt et al. "Offline/On-line Generation of RSA Keys with Smart Cards", International Workshop for Asian Public Key Infrastructures, Oct. 30, 2002, pp. 1-10.*

International Search Report form the European Patent Office in International Application No. PCT/IB2010/052935 mailed Oct. 1, 2010.

Boneh, et al., "Exposing an RSA Private Key Given a Small Fraction of its Bits", XP-002601136, ASIACRYPT '98, pp. 1-17, (1998).

Feyt, et al., "Off-line/On-line Generation of RSA Keys with Smart Cards", XP-002415053, International Workshop for Asian Public Key Infrastructures, pp. 1-10, (Oct. 30, 2002).

(Continued)

*Primary Examiner* — Brandon Hoffman
*Assistant Examiner* — Hee Song
(74) *Attorney, Agent, or Firm* — Husch Blackwell LLP

(57) ABSTRACT

Apparatus for ciphering, including a non-volatile memory, which stores a number from which a private cryptographic key, having a complementary public cryptographic key, is derivable, wherein the number is shorter than the private cryptographic key, and a processor, which is configured to receive an instruction indicating that the private cryptographic key is to be applied to data and, responsively to the instruction, to compute the private cryptographic key using the stored number and to perform a cryptographic operation on the data using the private cryptographic key. Related apparatus and methods are also described.

15 Claims, 2 Drawing Sheets

OTHER PUBLICATIONS

Written Opinion of the International Searching Authority from the European Patent Office in International Application No. PCT/IB2010/052935 mailed Oct. 1, 2010.

Krivoruchko, et al., "Storing RSA Private Keys in Your Head", 12$^{th}$ Pacific Rim International Symposium on Dependable Computing (PRDC '06), IEEE, pp. 1-8, (2006).

Sehgal, "Intelligent Security Mechanism for Network Communications", Master of Technology in Computer Science and Engineering, Department of Computer Science, Punjabi University, Patiala, Abstract, pp. i-v, and 1-121, (2007).

* cited by examiner

PRIVATE KEY COMPRESSION

CROSS REFERENCE TO RELATED APPLICATIONS

The present application is a 35 USC §371 application of PCT/IB2010/052935, filed on Jun. 28, 2010, and entitled "Private Key Compression", which was published on Jun. 30, 2011, in the English language as International Publication Number WO 2011/077269 and which claims priority of Israel Patent Application Serial Number 202973 filed Dec. 24, 2009, the content of all of which is incorporated herein by reference.

FIELD OF THE INVENTION

The present invention relates generally to cryptography, and specifically to handling of private keys used in asymmetric cryptography.

BACKGROUND OF THE INVENTION

The process of encryption converts ordinary information (referred to as "plaintext") into "ciphertext," which is unintelligible to anyone except those possessing special knowledge such as a key or possibly to a cryptanalyst. Decryption is the reverse process, converting ciphertext back to plaintext. Encryption and decryption are collectively referred to as "ciphering." Various algorithms—known as "ciphers"—are used for encryption and the reverse decryption process. The cipher uses a secret parameter, known as a "key," in carrying out the encryption and decryption processes. In the context of the present patent application and in the claims, the terms "key" and "cryptographic key" are used interchangeably, and it will be understood that in general, cryptographic keys may be used for both encryption and decryption as well as other cryptographic operations, for example, but not limited to, producing and verifying digital signatures.

Various types of ciphers are known in the art, including both symmetric and asymmetric types. In an asymmetric cipher, data are encrypted using a public key, which can be known to everyone. The resulting ciphertext can be decrypted only using a complementary private key, which is generally kept secret. Public/private key pairs can also be used to generate and verify digital certificates (or signatures). In the case of a digital certificates (or signature), the private key is used in a cryptographic operation operating on certain data to produce a digital certificate (signature), and the public key is used to verify the identity of the encrypting party. The term "cryptographic operation" is used herein generally to refer to both encryption/decryption and to digital signature generation/verification.

One of the most commonly used asymmetric ciphers is the Rivest Shamir Adleman (RSA) algorithm, which is described, for example, in U.S. Pat. No. 4,405,829. A pair of prime numbers, p and q, is used to generate the public and private keys, which have the form (n,e) and (n,d), respectively. Here n is referred to as the modulus and e and d are referred to as the exponents. The modulus n is simply the product of the prime numbers: $n=pq$. The public exponent e is an integer in the range $1 \leq e \leq \phi(pq)$, wherein the totient $\phi(pq)=(p-1)(q-1)$. The private exponent d is computed to satisfy the congruence relation $de=1(\bmod\ \phi(pq))$. Various methods and criteria are known in the art for choosing the primes and exponents, but they are beyond the scope of the present patent application. The security of encryption typically increases with the length of the modulus that is used. Therefore, it is now common in RSA encryption to use private keys with moduli and exponents that are 1024 bits or even longer.

Normally, public and private keys (or the prime numbers that are used to compute them) are stored in a computer memory belonging to the private key holder. Krivoruchko et al. point out certain risks in this approach, in "Storing RSA Private Keys in Your Head," $12^{th}$ *Pacific Rim International Symposium on Dependable Computing PRDC '06* (2006), pages 129-138. The authors note, for example, that an unauthorized party may gain access to the device in which the private key is stored and thus be able to steal the private key. In response to this problem, the authors describe a way of generating a public/private RSA key pair from a passphrase that a human user can remember and input to a computing device when needed.

SUMMARY OF THE INVENTION

Private cryptographic keys are normally stored in non-volatile memory, which may be costly. Embodiments of the present invention that are described hereinbelow provide apparatus and methods in which a number shorter than the private cryptographic key is stored in the non-volatile memory and is used by a processor in computing the private cryptographic key when needed.

There is thus provided in accordance with an embodiment of the present invention, an apparatus for ciphering, including a non-volatile memory, which stores a number from which a private cryptographic key, having a complementary public cryptographic key, is derivable, wherein the number is shorter than the private cryptographic key, and a processor, which is configured to receive an instruction indicating that the private cryptographic key is to be applied to data and, responsively to the instruction, to compute the private cryptographic key using the stored number and to perform a cryptographic operation on the data using the private cryptographic key.

Further in accordance with an embodiment of the present invention, no more than a part of the private cryptographic key is stored in the non-volatile memory.

Still further in accordance with an embodiment of the present invention, the data are encrypted using the public cryptographic key, and wherein the instruction causes the processor to decrypt the encrypted data using the computed private cryptographic key.

Additionally in accordance with an embodiment of the present invention, the private cryptographic key includes a modulus and a private exponent, which includes upper and lower parts, wherein the number stored in the memory is indicative of the lower part of the exponent, and wherein the processor is configured to compute the private exponent by calculating the upper part and concatenating the calculated upper part with the lower part.

Moreover in accordance with an embodiment of the present invention, the non-volatile memory further stores the modulus and a multiplicative factor relating the private exponent and a public exponent of the public cryptographic key, and wherein the processor is configured to calculate the upper part of the private exponent using the modulus, the public exponent and the multiplicative factor.

Further in accordance with an embodiment of the present invention, the multiplicative factor k is given by $de=k\phi(pq)+1$, d and e are the private and public exponents, respectively, $\phi(pq)=(p-1)(q-1)$, p and q are prime numbers and the modulus $n=pq$, and the upper part of d is equal to the upper part of $kn/e$.

Still further in accordance with an embodiment of the present invention, the number includes at least one seed, and wherein the processor is configured to expand the at least one seed in order to generate at least one prime number in a pair of prime numbers, and to compute the private cryptographic key from the pair of prime numbers.

Additionally in accordance with an embodiment of the present invention, at least one of the prime numbers is not stored in the non-volatile memory.

Moreover in accordance with an embodiment of the present invention, the at least one seed includes a single seed, and wherein the non-volatile memory stores at least one correction factor, and wherein the processor is configured to compute both of the prime numbers in the pair using the single seed and the at least one correction factor.

Further in accordance with an embodiment of the present invention, the processor is configured to compute a first one of the pair of the prime numbers using the seed and to compute a second one of the pair of the prime numbers as a function of the first one.

There is also provided in accordance with still another embodiment of the present invention, a method for ciphering, including storing in a non-volatile memory a number from which a private cryptographic key, having a complementary public cryptographic key, is derivable, wherein the number is shorter than the private cryptographic key, receiving an instruction indicating that the private cryptographic key is to be applied to data, responsively to the instruction, computing the private cryptographic key using the stored number, and performing a cryptographic operation on the data using the computed private cryptographic key.

Still further in accordance with an embodiment of the present invention, no more than a part of the private cryptographic key is stored in the non-volatile memory.

Additionally in accordance with an embodiment of the present invention, the data are encrypted using the public cryptographic key, and wherein performing the cryptographic operation includes decrypting the encrypted data using the computed private cryptographic key.

Moreover in accordance with an embodiment of the present invention, the private cryptographic key includes a modulus and a private exponent, which includes upper and lower parts, wherein storing the number in the memory includes storing an indication of the lower part of the exponent, and wherein computing the private cryptographic key includes computing the private exponent by calculating the upper part and concatenating the calculated upper part with the lower part.

Further in accordance with an embodiment of the present invention, the method includes storing in the non-volatile memory the modulus and a multiplicative factor relating the private exponent and a public exponent of the public cryptographic key, and wherein computing the private exponent includes calculating the upper part of the private exponent using the modulus, the public exponent and the multiplicative factor.

Still further in accordance with an embodiment of the present invention, the multiplicative factor k is given by $de=k\phi(pq)+1$, d and e are the private and public exponents, respectively, $\phi(pq)=(p-1)(q-1)$, p and q are prime numbers and the modulus $n=pq$, and calculating the upper part of the private exponent includes calculating the upper part of $kn/e$.

Additionally in accordance with an embodiment of the present invention, storing the number includes storing at least one seed, and wherein computing the private cryptographic key includes expanding the at least one seed in order to generate at least one prime number in a pair of prime numbers, and calculating the private cryptographic key from the pair of prime numbers.

Moreover in accordance with an embodiment of the present invention, at least one of the prime numbers is not stored in the non-volatile memory.

Further in accordance with an embodiment of the present invention, storing the at least one seed includes storing a single seed, and wherein the method includes storing at least one correction factor in the non-volatile memory, and wherein calculating the private cryptographic key includes computing both of the prime numbers in the pair using the single seed and the at least one correction factor.

Still further in accordance with an embodiment of the present invention, expanding the at least one seed includes computing a first one of the pair of the prime numbers using the seed and computing a second one of the pair of the prime numbers as a function of the first one.

There is also provided in accordance with still another embodiment of the present invention, a method for ciphering using a private cryptographic key including a modulus and a private exponent, with a complementary public cryptographic key including the modulus and a public exponent, the method including storing the modulus, the public exponent, and a lower part of the private exponent in a memory, computing an upper part of the private exponent using the stored modulus and the public exponent, generating the private exponent by concatenating the computed upper part with the stored lower part, and performing a cryptographic operation on data using the stored modulus and the generated private exponent.

Additionally in accordance with an embodiment of the present invention, the method includes storing a multiplicative factor relating the private exponent to the public exponent, wherein computing the upper part of the private exponent includes applying the multiplicative factor to the modulus and the public exponent.

Moreover in accordance with an embodiment of the present invention, the multiplicative factor k is given by $de=k\phi(pq)+1$, d and e are the private and public exponents, respectively, $\phi(pq)=(p-1)(q-1)$, p and q are prime numbers and the modulus $n=pq$, and computing the upper part of the private exponent includes calculating the upper part of $kn/e$.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

In some applications, non-volatile memory space is limited and relatively costly, and it is therefore desirable to reduce the amount of memory used to store private key information. For example, embedded computing devices that are programmed to perform RSA decryption or encryption may have only a small one-time programmable (OTP) memory available for containing this information. The problem is exacerbated as the size of private keys gets larger in order to increase resistance to decryption attacks.

Embodiments of the present invention that are described hereinbelow provide methods and apparatus that can be used to reduce the volume of memory that is used for storing private keys without significantly compromising cryptographic security. In the disclosed embodiments, a non-volatile memory stores a number from which a private cryptographic key is derivable. The stored number is shorter than the private cryptographic key itself, and no more than a part of the private key itself is actually stored in the non-volatile memory. (For example, the modulus of the private key may be stored, but not the exponent.) Upon receiving an instruction to perform a cryptographic operation on data using the private key, a processor computes the private key using the stored number, and then applies the computed key to the data.

Various methods are described hereinbelow for choosing the number to be stored in the non-volatile memory and computing the private cryptographic key from the number. The methods for computing the private key from the stored number are generally characterized by low computational cost, since devices with limited memory often have limited computing power, as well. The term "number" is used to refer to the datum that is stored in the memory for use in computing the key, regardless of whether the datum is actually defined in the memory as a number, string, or other data type.

Figure 1:
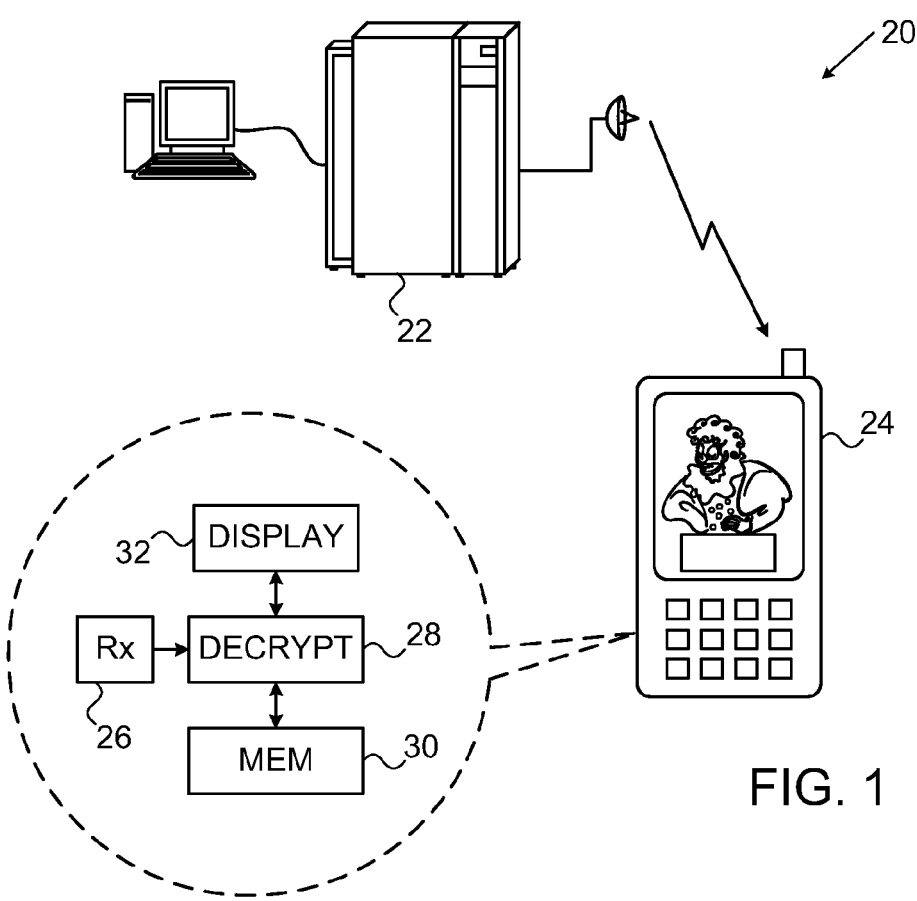
FIG. 1 is a block diagram that schematically illustrates a system for encrypted communications, in accordance with an embodiment of the present invention.

FIG. 1 is a block diagram that schematically illustrates a system 20 for encrypted communications, in accordance with an embodiment of the present invention. This system is shown here as an example of an application in which the principles of the present invention may be applied. The methods of private key generation that are described herein, however, are in no way limited to the context of this illustrative embodiment, and may be applied in substantially any setting in which private keys are used, whether or not associated with communications. Thus, for example, private keys generated in accordance with these methods may be used not only in decrypting encrypted data as in the pictured embodiment, but also in creation of digital certificates and other encryption functions.

In system 20, a server 22 transmits encrypted data to a client device 24. In this example, the data are assumed to comprise encrypted broadcast media, which are transmitted over a wireless link between the server and the client device. Alternatively, such data may be transmitted over networks of other types, including terrestrial networks, as well as over short-range links, such as radio frequency identification (RFID) applications. Some or all of the broadcast data may be encrypted using an asymmetric algorithm (such as RSA), and the data are then decrypted by client device using the appropriate private key. Alternatively, because asymmetric decryption is computationally demanding, the broadcast data may be encrypted using a symmetric algorithm. In this case, the key for symmetric decryption of the data may be encrypted using an asymmetric algorithm (and the key may be changed from time to time) and transmitted in encrypted form to the client device. The client device uses its own private key to decrypt the symmetric key and then applies the symmetric key to decrypt the broadcast data in the real time.

As shown in the inset in FIG. 1, device 24 comprises a receiver 26, which receives the encrypted data from server 22. A decryption processor 28 decrypts the data (which may comprise either actual broadcast data or an encrypted symmetric key, as noted above) using a private key that the processor computes based on a number stored in a non-volatile memory 30. Methods for computation of the private key by processor 28 are described in detail hereinbelow. Processor 28 applies the decrypted data in driving a display to play the transmitted broadcast.

To reduce the size of memory 30 and thus reduce the cost of device 24, the number stored in the memory for use by processor 28 in computing the private key is typically shorter than the private key itself. Memory 30 may comprise, for example, a one-time programmable (OTP) memory, which is programmed in the factory or in the field with a unique number (so as to generate a unique private key) for each individual client device that is produced. Although a part of the private key (such as the modulus) may be stored in memory 30, the complete private key is generally not stored, but is rather computed by processor 28 when needed.

Typically, decryption processor 28 computes the private key upon receiving an instruction indicating that the key is to be applied to data. For example, when a user of device 24 chooses an encrypted broadcast to receive and play on the device, the user input may invoke the instruction to the processor to generate the required private key. As another example, the start-up sequence of device 24 when the device is powered on may include an instruction to processor 28 to generate the private key in preparation for use. The private key may be held in volatile memory, such as random access memory (not shown in the figure), while device 24 is operating, but will generally be erased when the device is turned off or the key is no longer needed.

Figure 2:
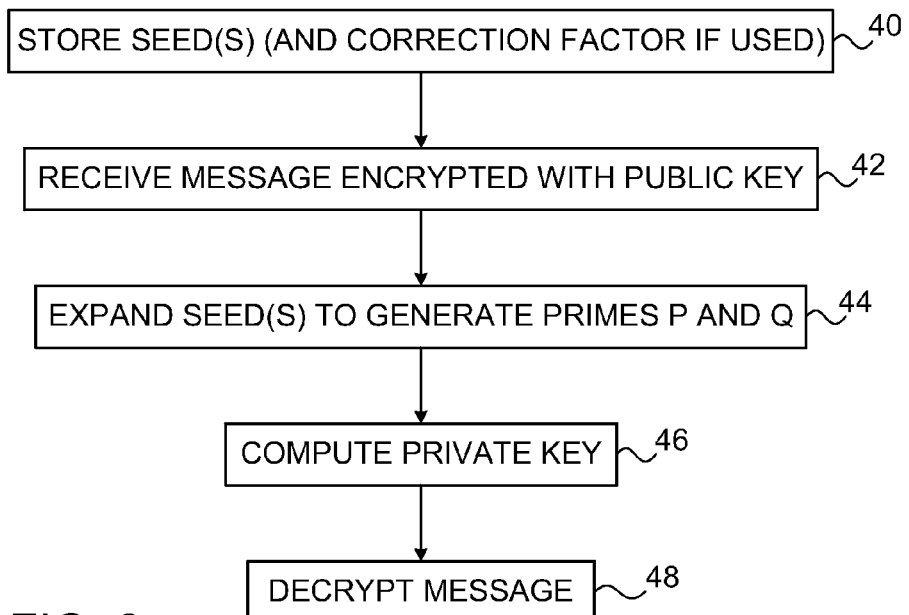
FIG. 2 is a flow chart that schematically illustrates a method for decrypting an encrypted message, in accordance with an embodiment of the present invention.

FIG. 2 is a flow chart that schematically illustrates a method for decrypting an encrypted message, in accordance with an embodiment of the present invention. As noted above, this method is described here, for the sake of clarity, in the context of the application environment of system 20 (FIG. 1). The techniques that it embodies for private key computation, however, are equally applicable in other applications of asymmetric cryptography. In the method of FIG. 2, one or more seeds—short numerical values—are stored and applied in computing the prime factors p and q of the modulus n, and these seeds are then used to compute the private key d. A number of possible variations on this method are described below.

The seed or seeds that will be used in computing at least one of the prime numbers p and q when needed are stored in memory 30, at a storage step 40. This step typically takes place at the time of manufacture, separately from the remaining steps in the method, although the seeds may also be stored after device 24 has been deployed in the field. In some variations on this embodiment, one or more correction factors are also stored. One or both of the prime numbers p and q, however, are not stored in the memory 30.

Device 24 receives a message (such as a broadcast stream) from server 22, at a reception step 42. The message is encrypted using the public key of device 24. If processor 28 has not already computed its private key, either at start-up or in response to some subsequent instruction, it will do so now. For this purpose, the processor expands the stored seed or seeds using a predefined function to generate primes p and q, at a seed expansion step 44. Once it has computed the primes, the processor computes the modulus n and exponent d of the private key, at a key computation step 46. This computation is based on the definitions presented above in the Background section and can use any suitable method that is known in the art for this purpose. The processor then applies the private key to decrypt the received message, at a decryption step 48.

A number of possible approaches may be taken in choosing the seeds to be stored at step 40 and the function used in expanding the seeds at step 44. Functions that may be used for this purpose are described, for example, in U.S. Pat. No.

7,340,606, whose disclosure is incorporated herein by reference. The function f(s), for example, may apply the seed s to a set of constant factors in order to generate a prime number of the appropriate length (which is typically roughly half the length of the desired modulus n). Different seeds are tested in advance in order to find the seeds that will generate acceptable prime values—one seed for p and the other for q. The seeds themselves should be long enough (for instance, 128 bits) to resist brute force decryption attacks on the prime factors.

It may be difficult and cumbersome to find sufficient seeds to generate pairs of prime factors for all of the devices in which such seeds are to be stored. To simplify this process, a small correction factor c (typically 1-2 bytes) may be associated with each seed. The correction factor is applied to adjust the outcome of f(s) to give a prime number, for example: p=f(s) XOR c. In this manner, a single seed, possibly with two seed expansion functions and two correction factors, can be used to generate both prime factors, for example: p=f(s) XOR $c_1$ and q=g(s) XOR $c_2$. Another option is to apply the correction factors before, rather than after, seed expansion, i.e., compute p=f(s XOR $c_1$) and q=g(s XOR $c_2$), wherein f and g may be the same function.

Yet another possibility is to compute one of the pair of the prime numbers using a stored seed and to compute the other prime number as a function of the first one. This function may be deterministic, in which case it is sufficient to store a single seed (and possibly a correction factor). Alternatively, the functional dependence between the prime factors may include other constraints that can be used in computing one factor from the other. For example, the method of generating the prime factors that is described in the above-mentioned U.S. Pat. No. 7,340,606 can ensure that the j most significant bits (MSB) of the modulus n=pq will have a certain known value and/or the k least significant bits (LSB) of n will have a certain known value (not the same value). In this case, once p has been expanded from its stored seed, q can be calculated as follows:

If the j MSB of n are a known number X, and the j MSB of p have been calculated to be a number Y, then the j MSB of q differ from the j MSB of $X*2^j/Y$ by no more than 2. Therefore, instead of storing the j MSB of q, it is sufficient to store this 2-bit difference in memory 30 and then add the difference to $X*2^j/Y$ in order to recover the j MSB of q.

If the k LSB of n are a known number Z, and the k LSB of p are a known number T, then the k LSB of q are equal to Z/T mod $2^k$ and need not be stored at all.

Figure 3:
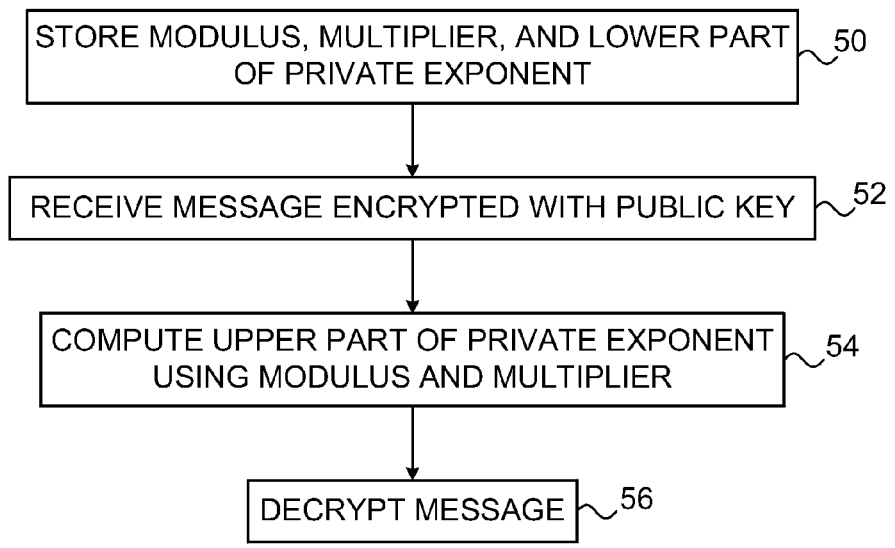
FIG. 3 is a flow chart that schematically illustrates a method for decrypting an encrypted message, in accordance with another embodiment of the present invention.

FIG. 3 is a flow chart that schematically illustrates a method for decrypting an encrypted message, in accordance with another embodiment of the present invention. This method will also be described in the context of system 20 (FIG. 1), although this method, like the method of FIG. 2, has broader applicability. In the method of FIG. 3, a part of the exponent d of the private key is stored, and the remaining part of d is computed based on the known exponent e of the public key and the modulus n. This method is useful particularly when, as is often the case, the length of the private exponent e is small (for instance, seventeen bits), p and q both have approximately the same bit length (half the length of the modulus n), and n is to be stored in memory 30 anyway.

The numbers that will be used in generating the private key are stored in memory 30, at a storage step 50 (similar to step 40 in FIG. 2). These stored numbers include indications of the modulus n, the lower part of the private exponent d, and a multiplicative integer factor k, which is given by de=k$\phi$(pq)+1. (k, in other words, is the smallest integer that is greater than the quotient de/$\phi$(pq).) The "indications" may comprise the numbers themselves or encoded forms that are transformed by processor 28 to yield the numbers when needed. The "lower part" means the least significant bits of d, typically approximately half the length of d when the above conditions on e, p and q are satisfied. Assuming d to be 1024 bits long, this technique typically makes it possible to reduce the required storage volume by nearly 500 bits.

Device 24 receives an encrypted message from server 22, at a message reception step 52 (as in step 42 in FIG. 2). Processor 28 computes the missing upper part of the private exponent, at key computation step 54. This computation uses the modulus, the public exponent and the multiplicative factor to compute the product kn/e, and the upper part of d is equal to the upper part of the product. (The reason this computation is possible is that when p and q have the same length, then the upper part of $\phi$(pq)=(p−1)(q−1) will be equal to the upper part of n=pq; and therefore the upper part of d=[k$\phi$(pq)+1]/e will be equal to the upper part of kn/e.)

Processor 28 concatenates the calculated upper part of d with the stored lower part in order to recover the complete private exponent. It then applies this private exponent together with the modulus in decrypting the message, at a decryption step 56.

Although the embodiments described above refer specifically to the use of private keys in data decryption, the principles of private key storage and computation that are exemplified in these embodiments may similarly be applied in other sorts of cryptographic operations, such as digital signature generation. It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

What is claimed is:

1. An apparatus to derive a private cryptographic key having a complementary public cryptographic key, the private cryptographic key including a modulus and a private exponent, the apparatus comprising:

a non-volatile memory to store a number, an indication of the modulus, and an indication of a multiplicative factor, wherein:
  the number is shorter than the private exponent of the private cryptographic key;
  the private exponent comprises an upper part and a lower part, the lower part being the least significant bits of the private exponent, the upper part being the bits of the private exponent excluding the lower part; and
  the number stored in the memory is indicative of the lower part of the private exponent; and a processor, which is configured to receive an instruction indicating that the private cryptographic key is to be applied to data and, responsively to the instruction, to compute the private cryptographic key and to perform a cryptographic operation on the data using the private cryptographic key, wherein the processor is configured to compute the private exponent by:
  computing the lower part of the private exponent using the stored number;
  computing the upper part of the private exponent using the modulus, the public exponent and the multiplicative factor; and
  concatenating the calculated upper part with the lower part.

2. The apparatus according to claim 1, wherein no more than a part of the private cryptographic key is stored in the non-volatile memory.

3. The apparatus according to claim 1, wherein the data are encrypted using the public cryptographic key, and wherein the instruction causes the processor to decrypt the encrypted data using the computed private cryptographic key.

4. The apparatus according to claim 1, wherein:
the multiplicative factor k is given by de=kφ(pq)+1;
d and e are the private and public exponents, respectively;
φ(pq)=(p−1)(q−1);
p and q are prime numbers and the modulus n=pq; and
the upper part of d is equal to the upper part of kn/e.

5. The apparatus according to claim 4, wherein p includes at least 512 bits and q includes at least 512 bits.

6. The apparatus according to claim 1, wherein the indication of the modulus is the modulus.

7. The apparatus according to claim 1, wherein the processor is operative to transform the indication of the modulus to yield the modulus.

8. The apparatus according to claim 1, wherein the indication of the multiplicative factor is the multiplicative factor.

9. The apparatus according to claim 1, wherein the processor is operative to transform the indication of the multiplicative factor to yield the multiplicative factor.

10. The apparatus according to claim 1, wherein the stored number is the lower part.

11. The apparatus according to claim 1, where the processor is operative to transform the stored number to yield the lower part.

12. A method to derive a private cryptographic key having a complementary public cryptographic key, the private cryptographic key including a modulus and a private exponent, the method comprising:
storing in a non-volatile memory a number, an indication of the modulus, and an indication of a multiplicative factor, wherein:
the number is shorter than the private exponent of the private cryptographic key;
the private exponent comprises an upper part and a lower part, the lower part being the least significant bits of the private exponent, the upper part being the bits of the private exponent excluding the lower part; and
the number includes an indication of the lower part of the private exponent;
receiving an instruction indicating that the private cryptographic key is to be applied to data;
responsively to the instruction, computing the private cryptographic key, wherein computing the private cryptographic key comprises computing the private exponent by:
computing the lower part of the private exponent using the stored number;
computing the upper part of the private exponent using the modulus, the public exponent and the multiplicative factor; and
concatenating the calculated upper part with the lower part; and
performing a cryptographic operation on the data using the computed private cryptographic key.

13. The method according to claim 12, wherein no more than a part of the private cryptographic key is stored in the non-volatile memory.

14. The method according to claim 12, wherein the data are encrypted using the public cryptographic key, and wherein performing the cryptographic operation comprises decrypting the encrypted data using the computed private cryptographic key.

15. The method according to claim 12, wherein:
the multiplicative factor k is given by de=kφ(pq)+1;
d and e are the private and public exponents, respectively;
φ(pq)=(p−1)(q−1);
p and q are prime numbers and the modulus n=pq; and
calculating the upper part of the private exponent comprises calculating the upper part of kn/e.

* * * * *

UNITED STATES PATENT AND TRADEMARK OFFICE
CERTIFICATE OF CORRECTION

| | | |
|---|---|---|
| PATENT NO. | : 8,457,309 B2 | Page 1 of 1 |
| APPLICATION NO. | : 13/322211 | |
| DATED | : June 4, 2013 | |
| INVENTOR(S) | : Belenky et al. | |

It is certified that error appears in the above-identified patent and that said Letters Patent is hereby corrected as shown below:

In the Claims

In column 8, lines 42-43 add --the public cryptographic key including the modulus and a public exponent,-- after "private exponent,".

In column 9, line 33 add --the public cryptographic key including the modulus and a public exponent,-- after "private exponent,".

Signed and Sealed this
Thirtieth Day of December, 2014

Michelle K. Lee
*Deputy Director of the United States Patent and Trademark Office*